(12) United States Patent
Chalmers et al.

(10) Patent No.: US 6,658,087 B2
(45) Date of Patent: Dec. 2, 2003

(54) NAUTICAL X-RAY INSPECTION SYSTEM

(75) Inventors: Alex Chalmers, Norwood, MA (US); Charles Squires, Newton, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 10/137,715

(22) Filed: May 2, 2002

(65) Prior Publication Data

US 2002/0185612 A1 Dec. 12, 2002

Related U.S. Application Data

(60) Provisional application No. 60/288,539, filed on May 3, 2001.

(51) Int. Cl.⁷ .............................................. G01N 23/203
(52) U.S. Cl. ............................................ 378/86; 378/87
(58) Field of Search ...................................... 378/86–89

(56) References Cited

U.S. PATENT DOCUMENTS

| | | | |
|---|---|---|---|
| 4,494,001 A | 1/1985 | Peck | 250/358.1 |
| 5,068,883 A | 11/1991 | DeHaan et al. | 378/86 |
| 5,237,598 A | 8/1993 | Albert | 378/99 |
| 5,313,511 A | 5/1994 | Annis et al. | 378/87 |
| 5,600,303 A | 2/1997 | Husseiny et al. | 340/568 |
| 5,638,420 A | 6/1997 | Armistead | 378/57 |
| 5,903,623 A | 5/1999 | Swift et al. | 378/57 |
| 5,936,240 A | 8/1999 | Dudar et al. | 250/253 |
| 6,081,580 A | 6/2000 | Grodzins et al. | 378/87 |
| 6,192,104 B1 | 2/2001 | Adams et al. | 378/90 |
| 6,249,567 B1 | 6/2001 | Rothschild et al. | 378/88 |

*Primary Examiner*—Craig E. Church
(74) *Attorney, Agent, or Firm*—Bromberg & Sunstein LLP

(57) ABSTRACT

An apparatus for inspecting a physical object in a nautical environment includes a radiation source capable of directing a beam of penetrating radiation toward the physical object, and a detector capable of detecting the reaction of the physical object to the penetrating radiation. In addition to detecting the reaction, the detector is capable of delivering an output signal characterizing the physical object. Accordingly, the output signal is based upon the reaction of the physical object to the penetrating radiation.

25 Claims, 3 Drawing Sheets

NAUTICAL X-RAY INSPECTION SYSTEM

PRIORITY

This U.S. patent application claims priority from U.S. provisional patent application No. 60/288,539, filed May 3, 2001, naming Alex Chalmers and Charles Squires as inventors, and having the title, "Scatter Based X-Ray Inspection System," the disclosure of which is incorporated herein, in its entirety, by reference.

FIELD OF THE INVENTION

The invention relates generally to non-invasive inspection of physical objects and, more particularly, the invention relates to the use of X-ray inspection systems to inspect physical objects in a nautical environment.

BACKGROUND OF THE INVENTION

The interdiction of illicit drugs, explosives, and other contraband is an important goal of law enforcement. To that end, a variety of technologies have been developed and deployed for the non-intrusive inspection of containers not readily susceptible to visual scrutiny from the outside. The non-intrusive aspect of these inspection techniques is important; the great majority of containers do not carry contraband, and the public would not long tolerate the delays, disruption (and in some cases damage) of property, and invasions of privacy that would occur if invasive inspection means were commonly used. Non-intrusive inspection typically is non-destructive and usually can be accomplished faster than intrusive inspection, thereby increasing productivity of inspectors. Increased productivity means more containers inspected and more contraband interdicted.

Among non-intrusive inspection methods, x-ray imaging in its many forms has been a proven technology capable of detecting a variety of contraband. X-ray systems have been based on transmission imaging in any of a variety of implementations: cone-beam (fluoroscopes), fanbeam, flying-spot, multi-projection configurations; dual-energy imaging; computed tomography; as well as on imaging incorporating the detection of x-ray radiation scattered in various directions.

U.S. Pat. No. 5,903,623 ("the '623 patent") discloses a land based device for inspecting a land based cargo container with penetrating radiation. Although useful, the '623 patent does not disclose or suggest a device that can be used to non-invasively inspect a physical object (e.g., a barge or boat) in a nautical environment. Without some kind of inspection means that can be remotely used by an inspecting boat, an uninspected boat with explosives or other dangerous materials can damage the inspecting boat, or the inspecting boat's protectorate.

SUMMARY OF THE INVENTION

In accordance with one aspect of the invention, an apparatus for inspecting a physical object in a nautical environment includes a radiation source capable of directing a beam of penetrating radiation toward the physical object, and a detector capable of detecting the reaction of the physical object to the penetrating radiation. In addition to detecting the reaction, the detector is capable of delivering an output signal characterizing the physical object. Accordingly, the output signal is based upon the reaction of the physical object to the penetrating radiation.

In illustrative embodiments, the apparatus includes a platform that may be in a nautical environment. The apparatus also may include a transmitter for transmitting the output signal. Such transmitted output signal may be received by an analysis unit, which also includes an image correction module.

Among other things, the radiation source includes an X-ray source. The detection apparatus may include devices implementing scatter-based radiation detection techniques, while the apparatus is free of devices implementing transmission-based radiation detection techniques. The detector thus may include at least one of a back scatter detector, a side scatter detector, and a forward scatter detector. In illustrative embodiments, the physical object and platform are capable of moving relative to each other.

In accordance with another aspect of the invention, a method of inspecting a physical object in a nautical environment directs a beam of radiation toward the physical object, and moves the beam of radiation relative to the physical object. In a manner similar to the above noted aspect of the invention, the physical object has a reaction to receipt of the beam of radiation. The reaction of the physical object thus is detected, and an output signal characterizing the physical object is produced. The output signal is based upon the detected reaction of the physical object.

In other embodiments, the output signal is transmitted to an analysis unit. The analysis unit then may be controlled to apply image correction to the output signal. The beam of radiation may be a pencil beam, while the reaction may be detected with at least one of a back scatter detector, a side scatter detector, and a forward scatter detector.

In accordance with other aspects of the invention, a system for inspecting a nautical object in a nautical environment includes an X-ray source for directing X-ray radiation toward the nautical object, and a scatter-based detector for detecting the reaction of the nautical object to the X-ray radiation. The detector also is capable of producing an output signal based upon the reaction of the nautical object. The nautical environment separates the system from the nautical object.

In some embodiments, the X-ray radiation has an energy level of between 100 KeV to 1 MeV. In other embodiments, the X-ray radiation has an energy level that is sufficient to provide an output signal when the nautical object is between ten and forty feet from the system. The system may include a nautical vessel that supports the X-ray source and the detector. The nautical vessel may be remotely controllable.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, a radiation source and detection system is used to inspect physical objects in a nautical environment by means of scatter X-ray technology. No transmission X-ray technology is required. Use of this system enables remote inspection of nautical vessels. Details of various embodiments are discussed below.

Figure 1:
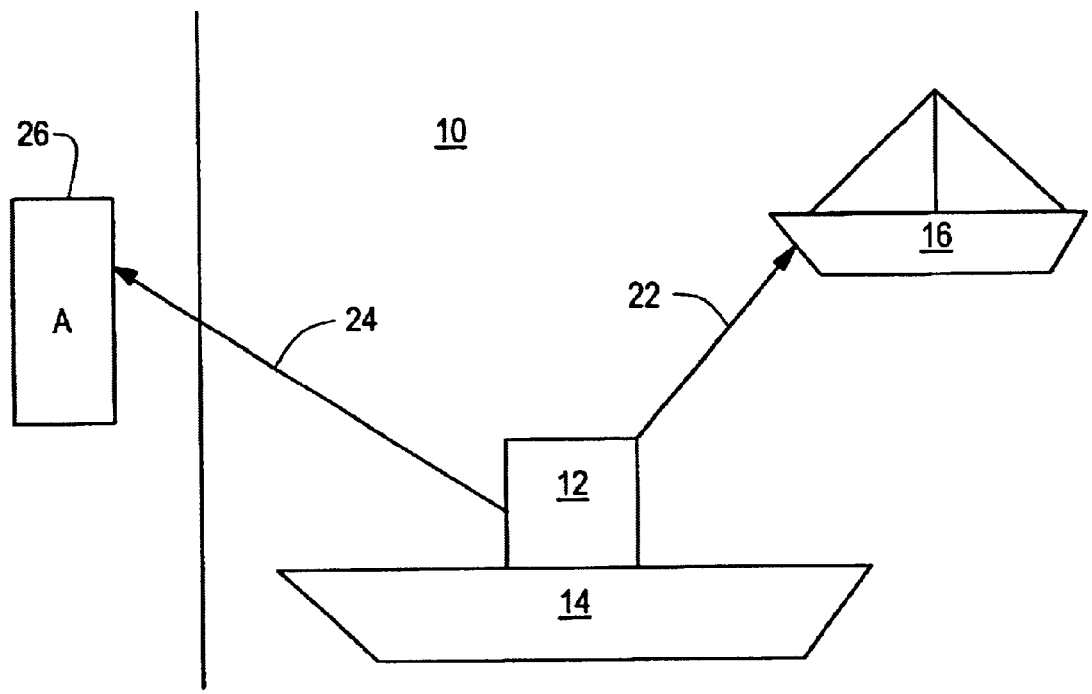
FIG. 1 schematically shows an exemplary nautical environment in which illustrative embodiments of the invention may be used.

FIG. 1 schematically shows an exemplary nautical environment 10 in which illustrative embodiments of the invention may be used. As used herein, a physical object is considered to be in a "nautical environment" when it is separated from land by a natural body of water. By way of example, a ship, boat, barge, or platform (e.g., an oil platform) in an ocean, sea, lake, river, or pond is considered to be in a nautical environment. A boat on land, however, is not considered to be in a nautical environment. In a similar manner, a dock extending into a natural body of water is not considered to be in a nautical environment since it is connected to the land (i.e., it is a man made extension of the land bordering the natural body of water). As a final example, a boat connected to an ocean dock by a line is considered to be in a nautical environment since it still is separated from land by a natural body of water.

Accordingly, FIG. 1 shows a nautical object inspection system (referred to herein as "inspection system 12") deployed on an inspection boat 14, and a target boat 16 being remotely and non-intrusively inspected by the inspection system 12. To that end, the inspection system 12 includes a container 18 (shown in detail in FIG. 2) housing a radiation source and detection system (referred to herein as "radiation system 20" and shown in detail in FIG. 3). The radiation system 20 emits a pencil beam 22 of X-rays toward the target boat 16, and responsively detects radiation scattered by the target boat 16 as a result of its interaction with the pencil beam 22.

In addition, the radiation system 20 may transmit an output signal 24 representing the target boat 16 to a land based analysis unit 26. Accordingly, in illustrative embodiments, the radiation system 20 may include a wireless transponder system (discussed below) for transmitting the output signal 24 to the analysis unit 26. Conventionally known wireless data transmission techniques may be used. Upon receipt, the analysis unit 26 may apply image correction to the output signal 24, and display an X-ray scatter image of the target image on a display device. In alternative embodiments, the analysis unit 26 also is based in a nautical environment, or it is a part of the inspection boat 14. In the latter case, the inspection boat 14 acts as a platform for the entire radiation system 20. In fact, in such embodiment, the analysis unit 26 may be considered to be a part of the radiation system 20.

Among other applications, the radiation system 20 may be used to inspect the target boat 16 for explosive materials. To ensure safety of a manned boat being protected, the inspection boat 14 may be unmanned so that it can closely approach the target boat 16. Such unmanned boat may be remotely controllable by conventional means, such as with conventional radio-frequency based controllers. In other embodiments, the inspection boat 14 may be a manned boat that inspects sea craft coming within a preselected distance.

Figure 2:
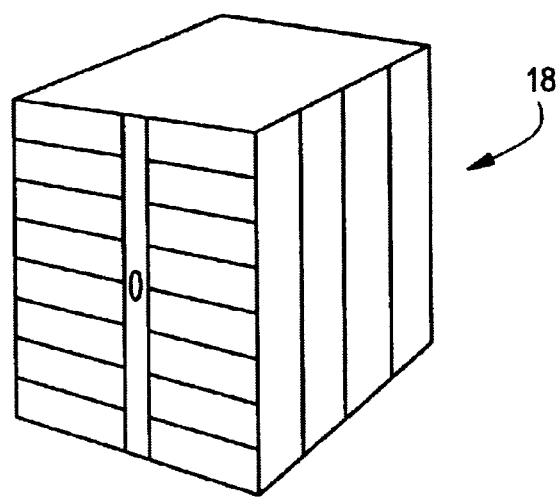
FIG. 2 schematically shows a container that may be used to contain a radiation source and detection device constructed in accordance with illustrative embodiments of the invention.

FIG. 2 shows the container 18 housing the radiation system 20. In general, the container 18 may be a receptacle for storing and transporting goods, and may include freight pallets as well as vehicles, such as automobiles, the cab and trailer of a truck, railroad cars, or ship-borne containers. The container 18 also may include structures and components of the receptacle itself. Any conventional shipping container may be used for containing the radiation system 20. It is preferred, however, that the radiation system 20 include one or both of source and detection elements that operate either through a thin-walled portion of the container 18, or exterior to the container 18. As known by those skilled in the art, the container 18 may be portable, thus permitting the entire inspection system 12 to be used in a variety of different environments. The container 18 may be any reasonable size, such as ten feet by eight feet by eight feet.

Figure 3:
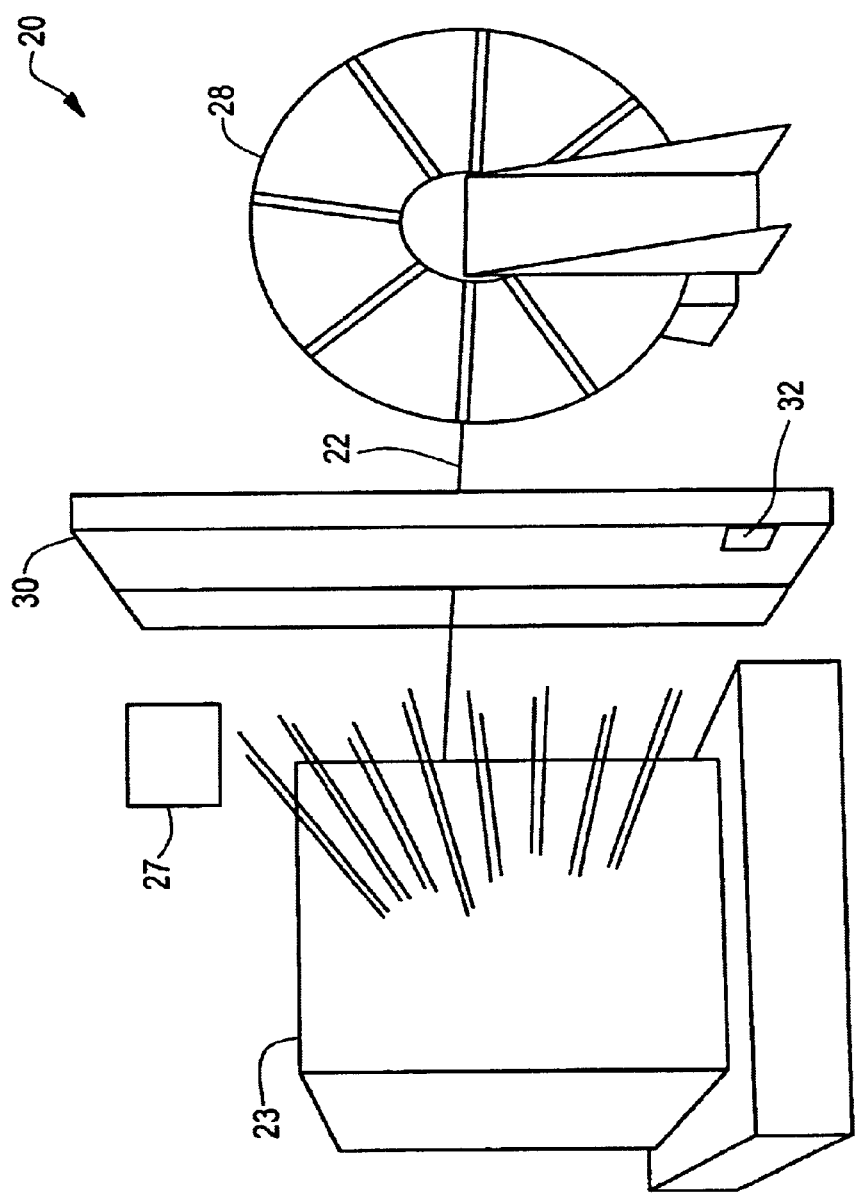
FIG. 3 schematically shows a radiation source and detection device constructed in accordance with illustrative embodiments of the invention.

FIG. 3 schematically shows an exemplary radiation system 20 that may be used with illustrative embodiments of the invention to inspect a physical object 23 (also shown in the figure). Specifically, the radiation system 20 includes a chopper wheel 28 for producing and directing a pencil beam 22 at the object 23, and one or more back scatter detector(s) (referred to herein as "detector 30") for detecting the resultant back scatter from the object 23. A side scatter detector and/or a forward scatter detector also may be used (both shown schematically as reference number 27). Note that although a pencil beam is discussed, other types of X-ray beams and/or radiation transmission means may be used. Accordingly, various embodiments are not limited to pencil beams.

The detector 30 also generates the output signal 24 in accordance with conventional processes. In some embodiments, the detector 30 includes both the detect and output signal generation functionality. Among other ways, both functions may be implemented as separate units, or as a single unit with dual functionality. As an example, the radiation system 20 may include back scatter X-ray subcomponents similar to those disclosed in the following commonly owned U.S. patents and/or patent applications, the disclosures of which are incorporated herein, in their entireties, by reference:

U.S. Pat. No. 5,903,623 (Swift et al.);
U.S. Pat. No. 6,081,580 (Grodzins et al.);
U.S. Pat. No. 6,192,104 (Adams et al.); and
U.S. Pat. No. 5,313,511 (Annis et al.).

Illustrative embodiments may produce pencil beams 22 of X-rays having energy levels ranging from 100 KeV to 1 MeV. Such energy levels should permit remote inspection from between about ten and forty feet from the object 23.

In illustrative embodiments, the chopper wheel 28 is reduced in size to be more portable. Consequently, the focal spot also should be reduced in size. The detector 30 also may include a transponder 32 that transmits the output signal 24 (characterizing the target boat 16) to the analysis unit 26. The transponder 32 may be a part of the detector 30, or may be connected to the detector 30 to receive the output signal 24. In addition, the transponder 32 may have a transmitter only, or both a transmitter and receiver. In illustrative embodiments, the transponder 32 is a distance measuring transponder.

Figure 4:
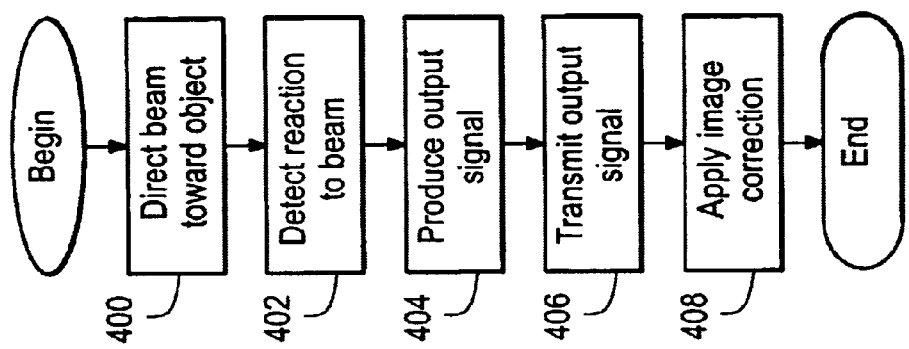
FIG. 4 shows an illustrative process of inspecting a physical object in a nautical environment.

FIG. 4 shows a process of inspecting a physical object in a nautical environment in accordance with illustrative embodiments of the invention. The process begins at step 400, in which the pencil beam 22 is directed toward an object, such as the target boat 16 of FIG. 1. The pencil beam 22 may be scanned in a vertical direction via the chopper wheel 28. During scanning, the target boat 16 and radiation system 20 move relative to each other, thus enabling a full boat scan. In some embodiments, the target boat 16 moves while the radiation system 20 stays stationary, while in other embodiments, the radiation system 20 moves while the target boat 16 remains relatively stationary. During testing, satisfactory results were achieved when the target boat 16 moved up to five miles per hour through the vertical scan pencil beam 22.

Upon receipt of the pencil beam 22, the target boat 16 reacts in an expected manner. Accordingly, the detector 30 detects this reaction (step 402), and produces the above noted output signal 24 characterizing the target boat 16 (step 404). The output signal 24 then may be transmitted to the analysis unit 26 for further processing (step 406).

Among other things, the analysis unit 26 applies image correction techniques to the output signal 24 (step 408) and then generates an output image for display. By way of example, the display may be an X-ray photograph of the target boat 16 on a lit reading device, or a cathode ray tube display device. In illustrative embodiments, the image correction techniques incorporate both conventional processes and additional processes to compensate for the additional difficulties associated with a nautical environment (e.g., waves moving the target boat 16). Specifically, the additional processes may subtract noise, boost the reaction signal produced by the target boat 16, and correct the aspect ratio of the target boat 16.

Figure 5:
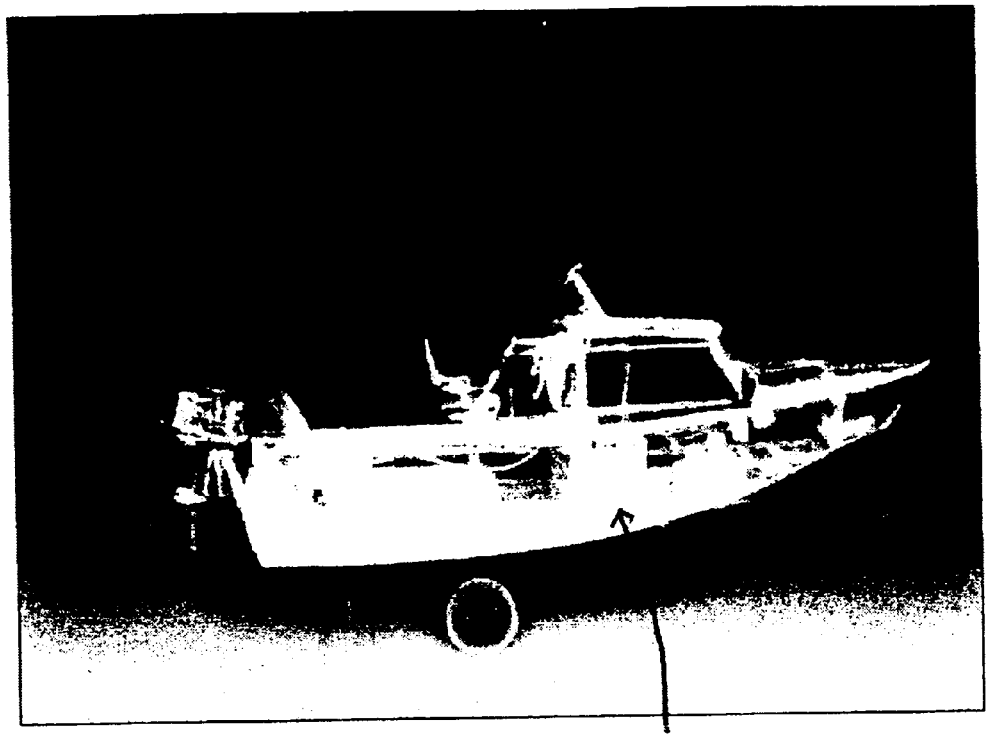
FIG. 5 shows a first exemplary X-ray image of a physical object taken by a radiation source and detection device constructed in accordance with illustrative embodiments of the invention.
Figure 6:
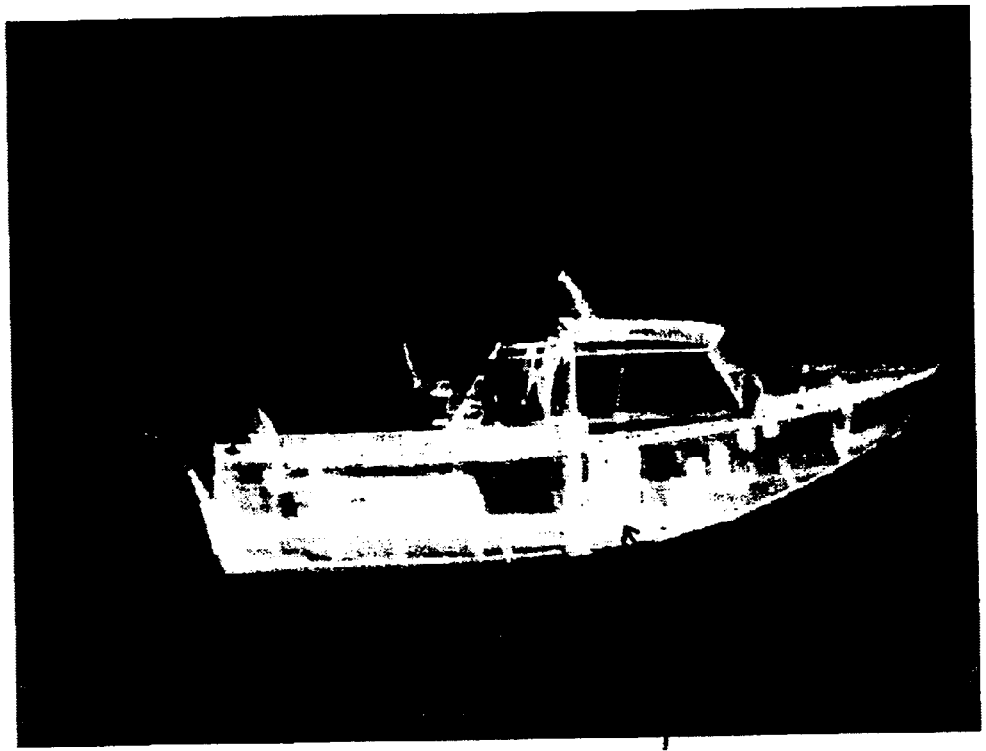
FIG. 6 shows a second exemplary X-ray image of a physical object taken by a radiation source and detection device constructed in accordance with illustrative embodiments of the invention

As noted above, experiments out of a nautical environment have been conducted with illustrative embodiments of the invention. FIGS. 5 and 6 show exemplary results of those experiments. In particular, FIG. 5 shows a target boat 16 taken about three feet from the radiation system 20 with a pencil beam 22 having an energy of about 450 Kev/6.6 ma. The figure clearly shows an explosive stimulant 34. In addition to the target boat 16, FIG. 5 also shows a man, with a gun, standing about nine feet from the radiation system 20. FIG. 6 shows target boat 16 taken about three feet from the radiation system 20 with a pencil beam 22 having an energy of about 250 Kev/3.3 ma. In a manner similar to FIG. 5, this figure also clearly shows an explosive stimulant 34. Other experiments demonstrated that increasing the distance between the radiation system 20 and the target boat 16 generally produces an elongated image of the target boat 16. Still other experiments conducted in a simulated nautical environment have produced satisfactory results. In a simulated environment, illustrative embodiments have detected hidden explosives in the hull of a boat 22 feet from the inspection system 12. As noted above, it is expected that illustrative embodiments may be able to detect hidden explosives 40 feet from the inspection system 12.

In alternative embodiments, the inspection system 12 is on land, but inspects boats in a nautical environment. For example, the inspection system 12 may be on the seacoast, like a lighthouse, and examine boats approaching the shore at a predetermined distance. For example, the inspection system 12 may be used to inspect boats at a dockside or an entrance to a waterway.

Due to its portability, the inspection system 12 may be moved alternatively between a land based platform, and a nautical based platform. Moreover, the inspection system 12 may be mounted on a permanent nautical device, such as an anchored platform in a nautical environment, and be remotely and/or manually controlled.

Accordingly, use of illustrative embodiments of the invention permits non-invasive examination and inspection of the contents of boats in a nautical environment. Among other benefits, this system improves traffic flow and does not require that target boats be within some apparatus, such as an apparatus associated with a target X-ray device.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. An apparatus for inspecting a nautical vessel in a nautical environment, the apparatus comprising:
    a radiation source capable of directing a beam of penetrating radiation toward the nautical vessel, the nautical vessel having a reaction to the beam of penetrating radiation;
    a detector capable of detecting the reaction of the nautical vessel, the detector being capable of delivering an output signal characterizing the nautical vessel, the output signal being based upon the reaction of the nautical vessel; and
    a platform supporting the radiation source and the detector, the platform being physically unsupported by the nautical vessel.

2. The apparatus as defined by claim 1 wherein the platform is on land.

3. The apparatus as defined by claim 1 wherein the platform is in a nautical environment.

4. The apparatus as defined by claim 1 further comprising:
    a transmitter for transmitting the output signal.

5. The apparatus as defined by claim 4 further comprising:
    an analysis unit for receiving the output signal from the transmitter, the analysis unit including an image correction module.

6. The apparatus as defined by claim 1 wherein the radiation source includes an X-ray source.

7. The apparatus as defined by claim 1 wherein the detector includes a scatter-based radiation source detection device, the apparatus being free of transmission-based detection devices.

8. The apparatus as defined by claim 1 wherein the detector includes at least one of a back scatter detector, a side scatter detector, and a forward scatter detector.

9. The apparatus as defined by claim 1 wherein the nautical vessel and platform are capable of moving relative to each other.

10. The apparatus as defined by claim 1 wherein the platform is in a nautical environment.

11. A method of inspecting a nautical vessel in a nautical environment, the method comprising:
    spacing a radiation source from the nautical vessel, a body of water separating the radiation source from the nautical vessel;
    directing a beam of penetrating radiation from the radiation source toward the nautical vessel;
    moving the beam of radiation relative to the nautical vessel, the nautical vessel having a reaction to the beam of radiation;
    detecting the reaction of the nautical vessel; and
    producing an output signal characterizing the nautical vessel, the output signal being based upon the detected reaction of the nautical vessel.

12. The method as defined by claim 11 further comprising:
    transmitting the output signal to an analysis unit.

13. The method as defined by claim 12 further comprising:
controlling the analysis unit to apply image correction to the output signal.

14. The method as defined by claim 11 wherein the beam of radiation is a pencil beam.

15. The method as defined by claim 11 wherein the reaction is detected with at least one of a back scatter detector, a side scatter detector, and a forward scatter detector.

16. A system for inspecting a nautical vessel in a nautical environment, the system comprising:
an X-ray source for directing X-ray radiation toward the nautical vessel, the nautical vessel having a reaction to the X-ray radiation; and
a scatter-based detector for detecting the reaction of the nautical vessel and producing an output signal based upon the reaction of the nautical vessel, a body of water separating the system from the nautical vessel.

17. The system as defined by claim 16 wherein the X-ray radiation has an energy level between 100 KeV to 1 MeV.

18. The system as defined by claim 16 wherein the X-ray radiation has an energy level that is sufficient to provide an output signal of the nautical vessel when the nautical vessel is between ten and forty feet from the system.

19. The system as defined by claim 16 further comprising:
a second nautical vessel that supports the X-ray source and the detector, the nautical vessel being remotely controllable.

20. An apparatus for inspecting a nautical vessel in a nautical environment, the apparatus comprising:
means for spacing a radiation source from the nautical vessel, a body of water separating the radiation source from the nautical vessel;
means for directing a beam of penetrating radiation from the radiation source toward the nautical vessel;
means for moving the beam of radiation relative to the nautical vessel, the nautical vessel having a reaction to the beam of radiation;
means for detecting the reaction of the nautical vessel; and
means for producing an output signal characterizing the nautical vessel, the output signal being based upon the detected reaction of the nautical vessel.

21. The apparatus as defined by claim 20 further comprising means for transmitting the output signal to an analysis unit.

22. The apparatus as defined by claim 21 further comprising means for controlling the analysis unit to apply image correction to the output signal.

23. The apparatus as defined by claim 20 wherein the means for detecting the reaction includes a scatter-based detector.

24. The apparatus as defined by claim 9 wherein the platform is substantially stationary.

25. The method as defined by claim 11 wherein the radiation source is substantially stationary.

* * * * *